United States Patent
Nagle et al.

(10) Patent No.: US 10,776,226 B2
(45) Date of Patent: Sep. 15, 2020

(54) SYSTEM AND METHOD TO MIGRATE SETTINGS FOR A UNIT IN A NETWORKED AV SYSTEM

(71) Applicant: Harman Professional, Inc., Northridge, CA (US)

(72) Inventors: Daniel Allan Nagle, Harvest, AL (US); Lysle Edward Shields, III, Huntsville, AL (US)

(73) Assignee: Harman Professional, Inc., Northridge, CA (US)

( * ) Notice: Subject to any disclaimer, the term of this patent is extended or adjusted under 35 U.S.C. 154(b) by 85 days.

(21) Appl. No.: 16/169,368

(22) Filed: Oct. 24, 2018

(65) Prior Publication Data

US 2019/0121707 A1 Apr. 25, 2019

Related U.S. Application Data

(60) Provisional application No. 62/576,773, filed on Oct. 25, 2017.

(51) Int. Cl.
| | |
|---|---|
| *G06F 11/00* | (2006.01) |
| *G06F 11/20* | (2006.01) |
| *G06F 3/06* | (2006.01) |
| *H04L 29/06* | (2006.01) |
| *G06F 21/60* | (2013.01) |
| *H04L 12/24* | (2006.01) |
| *H04L 9/08* | (2006.01) |
| *H04L 12/26* | (2006.01) |
| *G06F 21/73* | (2013.01) |
| *H04L 9/14* | (2006.01) |

(Continued)

(52) U.S. Cl.
CPC ............ *G06F 11/203* (2013.01); *G06F 3/067* (2013.01); *G06F 3/0617* (2013.01); *G06F 3/0647* (2013.01); *G06F 11/1658* (2013.01); *G06F 11/2025* (2013.01); *G06F 11/2028* (2013.01); *G06F 21/602* (2013.01); *G06F 21/6209* (2013.01); *G06F 21/73* (2013.01); *H04L 9/088* (2013.01); *H04L 9/14* (2013.01); *H04L 9/3239* (2013.01); *H04L 41/0663* (2013.01); *H04L 41/0806* (2013.01); *H04L 41/0856* (2013.01); *H04L 41/28* (2013.01); *H04L 43/0817* (2013.01); *H04L 63/166* (2013.01)

(58) Field of Classification Search
CPC .. G06F 11/1658; G06F 11/20; G06F 11/2025; G06F 11/2028; G06F 11/203
See application file for complete search history.

(56) References Cited

U.S. PATENT DOCUMENTS

| | | |
|---|---|---|
| 5,940,507 A | 8/1999 | Cane et al. |
| 7,693,966 B2 | 4/2010 | Schmid |

(Continued)

*Primary Examiner* — Charles Ehne
(74) *Attorney, Agent, or Firm* — Angela M. Brunetti

(57) ABSTRACT

Upon detection, by a central server, of failed unit and a replacement unit, a manifest for the failed unit encrypted with a first key known by the central server and each unit in a plurality of units. The manifest also contains a configuration bundle encrypted with a second key known only to each of the units so it cannot be decrypted by the central server. The manifest is pushed to the replacement unit where it is decrypted by the replacement unit using the first and second keys so that the archived settings and the configuration bundle may be migrated from the failed unit to the replacement unit.

16 Claims, 5 Drawing Sheets

(51) Int. Cl.
G06F 21/62 (2013.01)
H04L 9/32 (2006.01)
G06F 11/16 (2006.01)

(56) References Cited

U.S. PATENT DOCUMENTS

| | | | |
|---|---|---|---|
| 7,801,871 B2 | 9/2010 | Gosnell | |
| 2010/0180281 A1* | 7/2010 | Chandra | G06F 9/4451 |
| | | | 719/319 |
| 2016/0127372 A1* | 5/2016 | Unterschuetz | H04L 67/12 |
| | | | 726/4 |
| 2018/0006870 A1* | 1/2018 | McChord | H04L 69/18 |

* cited by examiner

SYSTEM AND METHOD TO MIGRATE SETTINGS FOR A UNIT IN A NETWORKED AV SYSTEM

CROSS REFERENCE TO RELATED APPLICATION

This application claims the benefit of U.S. Provisional Application Ser. No. 62/576,773, filed Oct. 25, 2017, the disclosure of which is incorporated in its entirety by reference.

TECHNICAL FIELD

The inventive subject matter is directed to a networked Audio/Video (AV) system and more particularly to a system and method to migrate settings for a replacement unit that is part of a networked AV system.

BACKGROUND

A networked AV system typically involves a complex configuration to interconnect different units for the transmission of audio, video, or both. A properly configured networked AV system should only require routine maintenance, typically in the form of periodic security patches. However, as the system ages, units within the system may deteriorate, damage may occur, power outages may adversely affect units. Units may fail, requiring replacement.

When a new unit arrives, settings from the failed unit are often not known. For example, the original development team may have changed, settings may have been tweaked during operation, needs of the system may have changed over years of operation, making installation of the replacement unit within the networked AV system a daunting task.

There is a need for a system and method to archive and migrate settings for failed units to a replacement unit.

SUMMARY

A system and method for migrating settings archived from a failed unit to a replacement unit, the system having a central server having a plurality of units having a standard secure socket connection to the central server. A secure password authorizes the central server to archive settings for at least one unit in the plurality of units. Upon detection of a replacement unit having a standard secure socket connection to the central server, a manifest for a failed unit in the at least one unit in the plurality of units is requested by the central server, the manifest sent by the failed unit is encrypted with a first key known by the central server and each of the units in the plurality of units. The manifest also contains a configuration bundle, the configuration bundle is encrypted with a second key known only to each of the units so it cannot be decrypted by the central server. The manifest is pushed to the replacement unit where it is decrypted by the replacement unit using the first and second keys so that the archived settings and the configuration bundle may be migrated from the failed unit to the replacement unit.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DETAILED DESCRIPTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
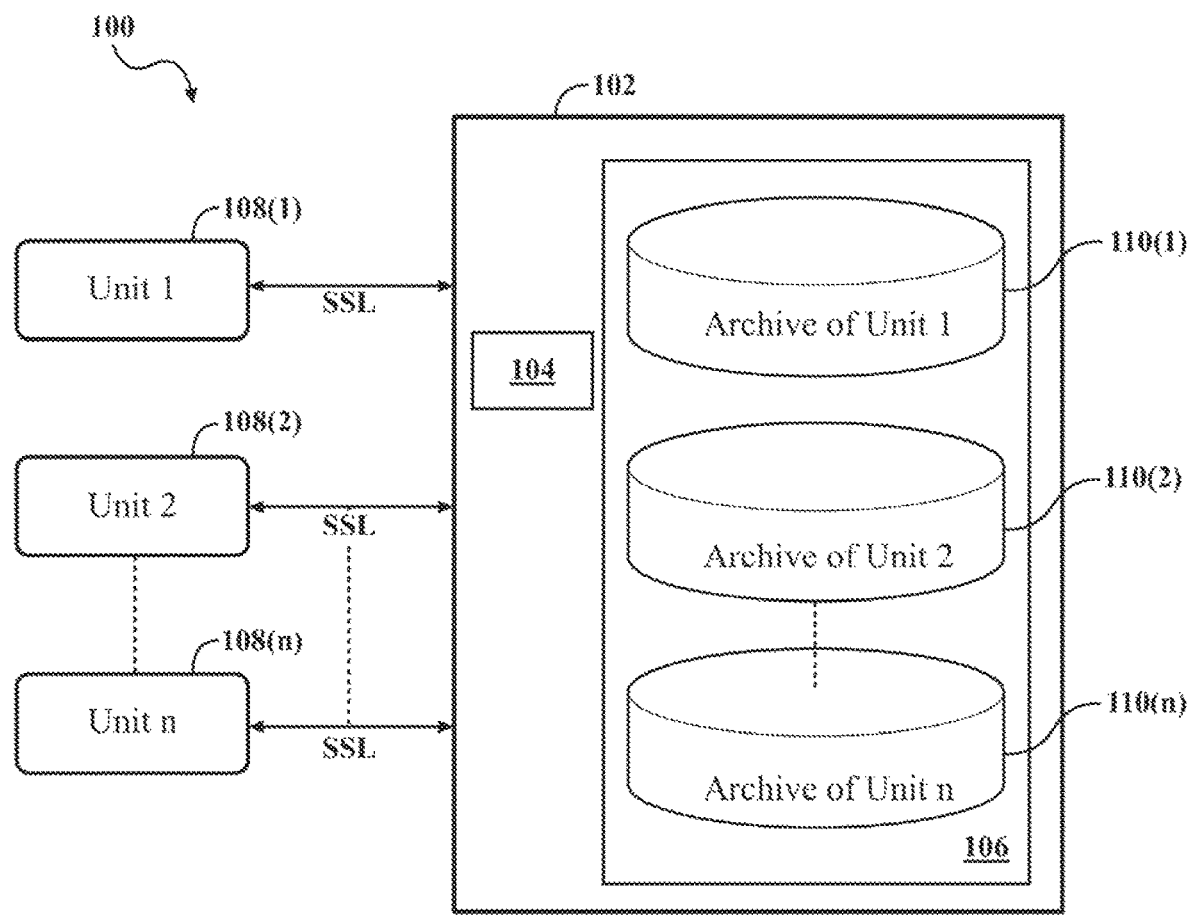
FIG. 1 is block diagram of a central server in communication with a plurality of units in a networked AV system.

FIG. 1 is a block diagram 100 of a central server 102 having a processor 104 and memory 106. In general, the processor 104 (such as a microprocessor) receives instructions, for example from memory 106, a computer-readable storage medium or the like and executes the instructions. The processor 104 includes a non-transitory computer-readable storage medium capable of executing instructions of a software program. The computer-readable storage medium may be, but is not limited to, an electronic storage device, a magnetic storage device, an optical storage device, an electromagnetic storage device, a semi-conductor storage device, or any suitable combination thereof. A communication means, such as a data bus, for communicating with the processor is also included. The central server includes computer executable instructions that may be compiled or interpreted from computer programs created using a variety of programming languages and/or technologies.

A plurality of units 108(1)-108(n) are each in communication with the central server 102. The units 108(1)-108(n) are devices that are known to be part of a networked AV system, such as encoders, decoders, hard drives, and other devices too numerous to mention herein, that support archiving settings. The units may also include a processor and memory. The processor (such as a microprocessor) receives instructions, for example from memory, a computer-readable storage medium or the like and executes the instructions. The processor includes a non-transitory computer-readable storage medium capable of executing instructions of a software program. The computer-readable storage medium may be, but is not limited to, an electronic storage device, a magnetic storage device, an optical storage device, an electromagnetic storage device, a semi-conductor storage device, or any suitable combination thereof. A communication means, such as a data bus, for communicating with the processor, other devices, and the central server is also included. The unit includes computer executable instructions that may be compiled or interpreted from computer programs created using a variety of programming languages and/or technologies.

The central server 102 monitors the status of the units 108(1)-108(n). A settings archive 110(1)-110(n) is associated with each of the units in the plurality of units 108(1)-108(n) and is stored at the central server 102. The settings archives 110(1)-110(n) are a snapshot of settings and files captured from each unit. The central server 102 refreshes it archives of the units 108(1)-108(n) on a regular basis to keep them current.

Communication between the central server 102 and the units 108(1)-108(n) is handled through standard secure socket layers (SSL). An encrypted connection is negotiated and a secure password is needed to authorize any archive-related task. In practice, the secure password may be assigned by an administrator and given to the central server 102 and units 108(1)-108(n) prior to any task for archiving settings for each of the units 108(1)-108(n).

Figure 2:
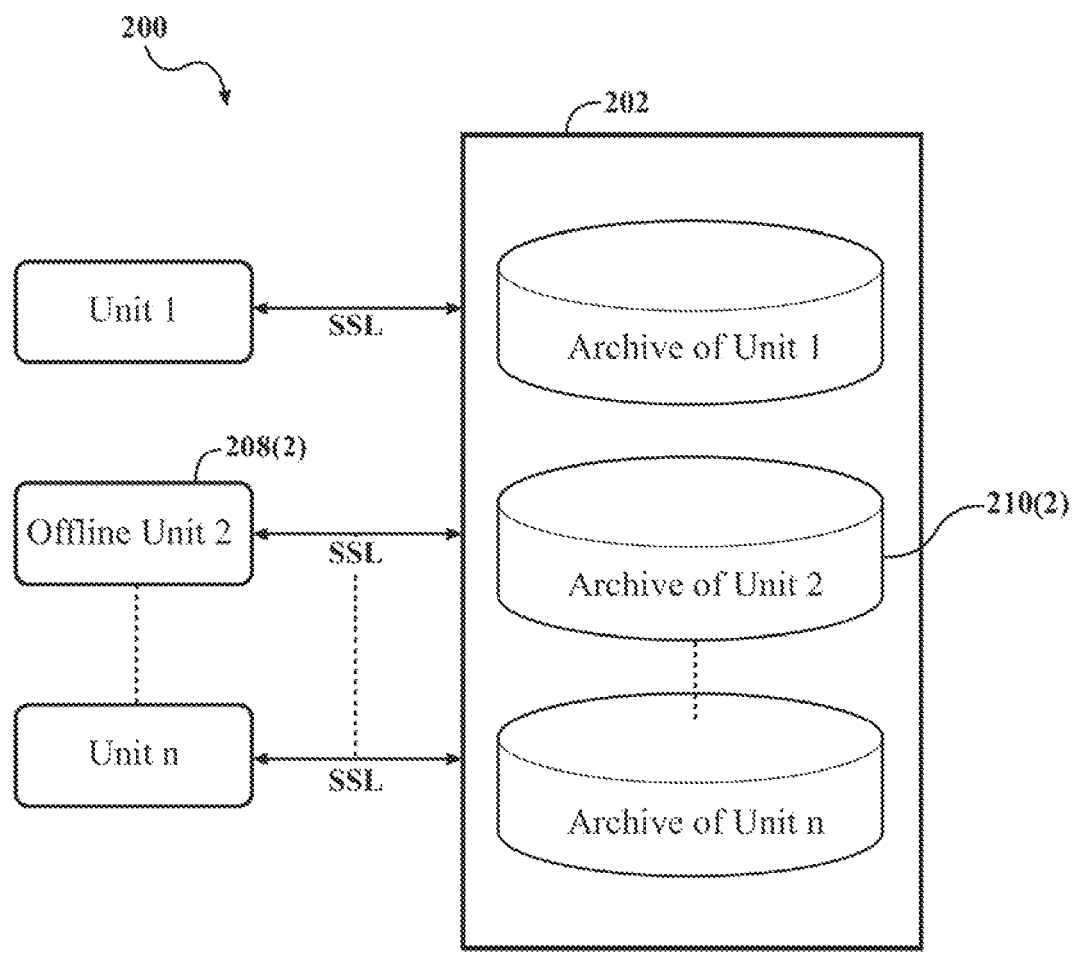
FIG. 2 is a block diagram depicting a failed unit.

FIG. 2 is a block diagram 200 depicting a failed unit 208(2). The central server 202 monitors the status of the units 208(1)-208(n) and will detect the failed unit 208(2). Eventually, the failed unit 208(2) will be removed and a replacement unit (not shown in FIG. 2) will be installed. The central server 202 has the settings archive 210(2) of the failed unit 208(2). It should be noted that a settings archive 210(2) may only be migrated to a replacement unit having an equal or later software version.

Figure 3:
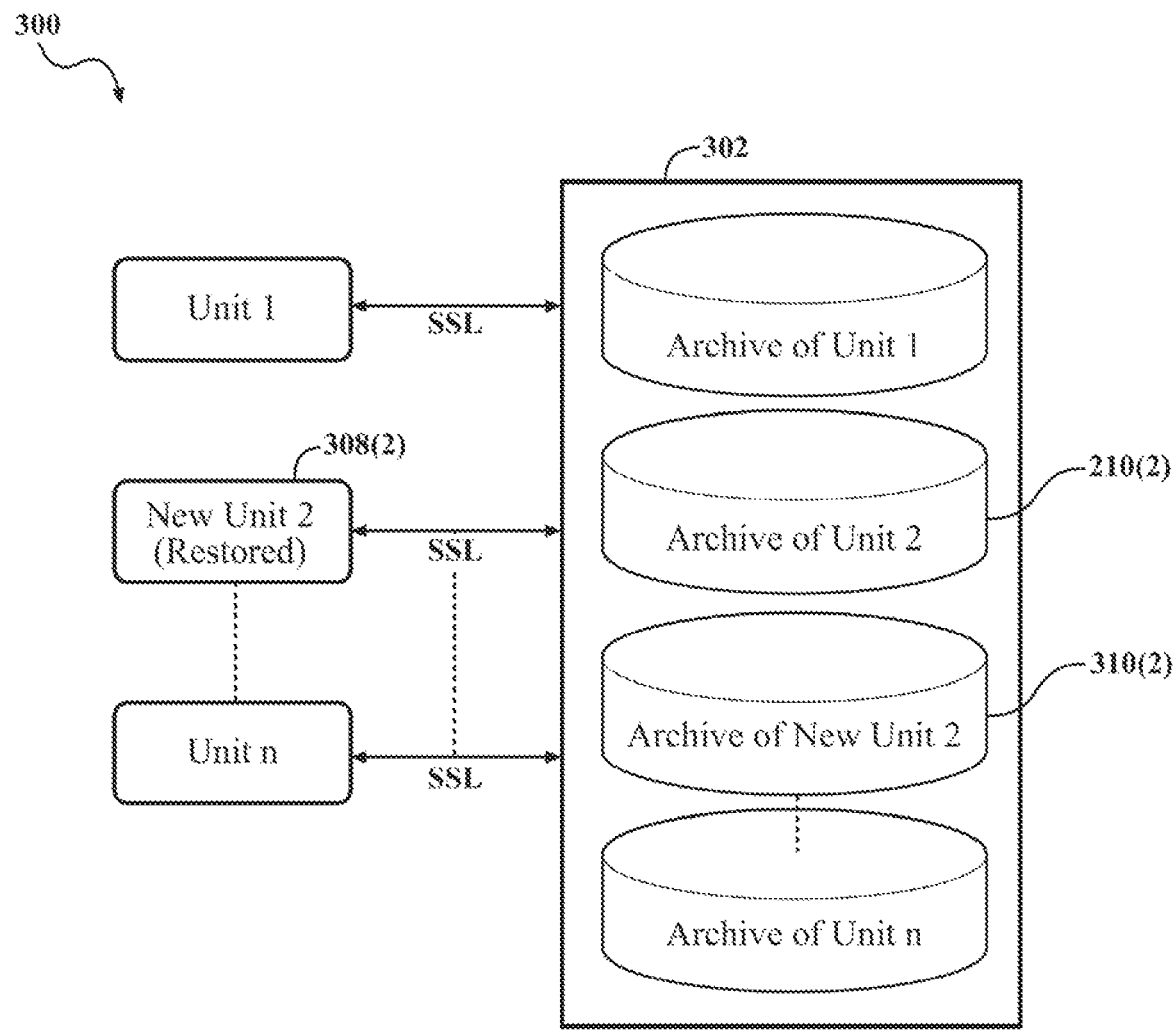
FIG. 3 is a block diagram depicting a replacement unit.

FIG. 3 is a block diagram 300 depicting the replacement unit 308(2). The settings archive 201(2) of the failed unit is retrieved from the central server 302, migrated to the replacement unit 308(2) and used to configure the replacement unit 308(2). A new setting archive 310(2) is then stored at the central server 302 for the replacement unit 308(2).

Figure 4:
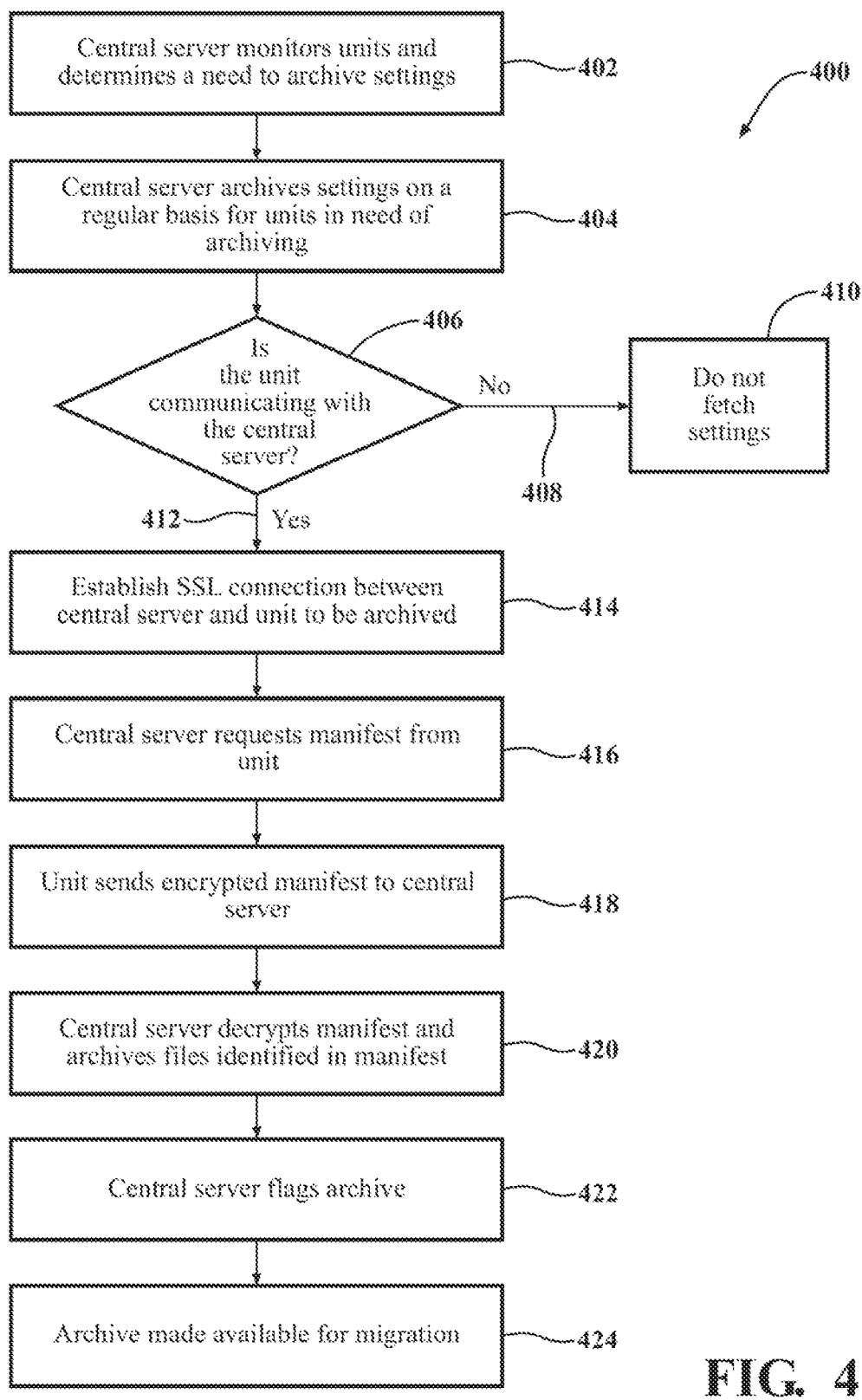
FIG. 4 is a flow chart of a method for archiving and migrating settings for the plurality of units.

FIG. 4 is a flowchart 400 of a method for fetching settings archives for one or more units in a networked AV system. The central server monitors 402 each unit and determines whether there is a need to archive settings for each unit. For example, a settings archive that is less than one day old does not need to be fetched. On a regular basis, the central server fetches 404 settings archives from one or more units. The central server only fetches archive settings for units that are communicating with the central server and support SSL connections. The method determines 406 whether the unit is communicating. If not 408, the settings archive will not be fetched 410 by the central server. If the unit is communicating 412 with the central server, an SSL connection is established 414 between the central server and the unit.

The central server requests 416 a manifest from the unit. The unit sends 418 an encrypted manifest to the central server. The unit may send its manifest through file transfer protocol, for example an "mget" protocol. Any simple file transfer protocol that is performed for each file sent through the SSL connection may be used. Again, file transfer protocols all take place using an SSL connection.

The manifest is encrypted with a key that is known only to the central server and the unit being addressed for archiving. The central server decrypts the manifest and archives 420 the filed identified within the manifest. The manifest is the first file fetched by the central server and identifies files from the unit to be archived. For example, the manifest file format may be <MD5 HASH><size in bytes><absolute file path on unit>. The central server may use file sizes and MD5 hashes to verify file integrity during the transfer process. The central server may also use MD5 hashes to detect if a particular file has already been archived and does not need fetching. While MD5 hashing is described herein as a way to verify file integrity, another hashing algorithm may be used, such as SHA-1, SHA-2, etc. Checksum is also a viable alternative. The absolute path is a unique file string saved by the central server. The manifest identifies every file in the unit that needs to be archived. The central server will attempt and re-attempt to fetch all of them until it has successfully traversed the manifest.

Upon completion of the archive, the central server will flag the archive as complete 422 and make it available 424 as a restore option for unit migration. It should be noted that system configuration settings returned by the unit are a configuration bundle listed in the manifest. However, for security purposes, the configuration bundle is sent to the central server in an encrypted format using keys so that the central server cannot decrypt it. Only a target unit such as a replacement unit is able to decrypt the system configuration settings. This will be discussed in detail later herein.

Figure 5:
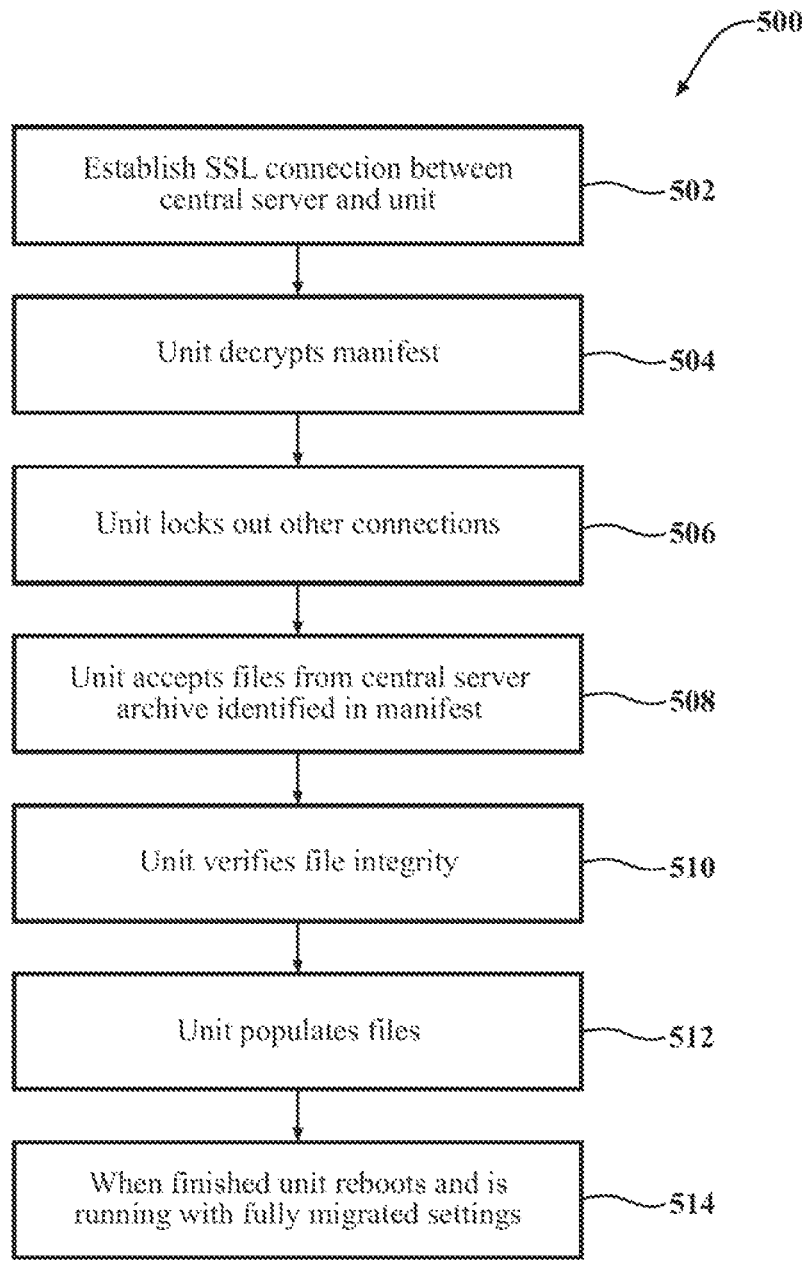
FIG. 5 is a flow chart of a method for pushing settings archives to a replacement unit in a networked AV system.

FIG. 5 is a flow chart 500 of a method for pushing settings archives to a replacement unit in a networked AV system. Pushing the settings archive may be accomplished using a simple file transfer protocol, for example an "mput" command and the central server simply echoes back what was last fetched. An SSL connection is established 502 between the central server and the unit that will be receiving the settings archive. The first file sent from the setting archive to the unit is the encrypted manifest. The unit will decrypt 504 the manifest. The unit will only accept files identified in the manifest. During the pushing process, the unit locks out 506 other connections. Lock out is maintained until migration is complete.

The unit accepts 508 files from the settings archive sent from the central server and identified in the manifest. The unit will verify file integrity 510 with the manifest's MD5 hashes and file sizes and its own decryption key. Again, while MD5 hashing is specifically described herein, other alternative hashing algorithms or checksum may also be used to verify file integrity. As discussed above, system configuration settings that were returned by the unit during archiving are a configuration bundle listed in the manifest. For security purposes, the configuration bundle was sent to the central server in an encrypted format using keys so that the central server cannot decrypt it. Only the unit, such as a replacement unit, is able to decrypt the system configuration settings using its own decryption keys.

Finally, the unit populates 512 the files. Upon completing, the unit reboots 514 and is running with fully migrated settings.

It is known that any system or method that uses external network connections may be subject to errors. Therefore, the system and method described herein uses file sizes, MD5 hashes, and encrypted connection to maintain transfer integrity. As an added check, the system and method herein also encrypts critical files such as the manifest and the configuration settings, to prevent loading of corrupt and tampered files. In the event any step in a trust chain should fail, the file is discarded and retried. If too many failures should occur, the process is abandoned.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A system for migrating settings archived from a failed unit to a replacement unit, the system comprising:
   a central server having a plurality of units having a standard secure socket connection to the central server;
   a secure password authorizing the central server to archive settings for at least one unit in the plurality of units;
   a replacement unit having a standard secure socket connection to the central server; and
   a manifest for a failed unit in the at least one unit in the plurality of units is requested by the central server, the manifest sent by the failed unit is encrypted with a first key known by the central server and each of the units in the plurality of units, the manifest contains a configuration bundle, the configuration bundle is encrypted with a second key known only to each of the units and cannot be decrypted by the central server, the manifest is pushed to the replacement unit to be decrypted by the replacement unit using the first and second keys, the manifest integrity is verified using file size, hashing, and encrypted connections, once verified the archived settings and the configuration bundle are migrated from the failed unit to the replacement unit.

2. The system as claimed in 1 wherein the secure password authorizing the central server to archive settings for the at least one unit in the plurality of units further comprises archive settings for at least one unit in the plurality of units that are at least one day old.

3. The system as claimed in claim 1 wherein the archived settings are only migrated to a replacement unit having an equal or later software version as the failed unit.

4. The system as claimed in claim 1 wherein the manifest is sent to the central server using an mget protocol and the manifest is sent to the replacement unit using an mput protocol.

5. The system as claimed in claim 1 wherein the manifest further comprises MD5 hashes to verify manifest integrity before the archived settings and the configuration bundle are migrated to the replacement unit.

6. A method for migrating settings archived from a failed unit to a replacement unit, the method comprising the steps of:
   negotiating an encrypted standard secure socket (SSL) connection between a central server and a plurality of units connected thereto;
   receiving, at the central server and the plurality of units connected thereto, a secure password for archive-related tasks;
   monitoring, at the central server, a status of each unit;
   detecting a failed unit;
   detecting a replacement unit;
   fetching archived settings associated with the failed unit;
   requesting a manifest from the failed unit, the manifest is encrypted with a first key known to the central server and includes a configuration bundle, the configuration bundle is encrypted with a second key that cannot be decrypted by the central server, the second key can be decrypted by the replacement unit;
   verifying the integrity of the archived settings associated with the failed unit using file sizes, hashed and encrypted connections; and
   pushing the archived settings associated with the failed unit to the replacement unit.

7. The method as claimed in claim 6 wherein the step of verifying the integrity of the archived settings further comprises using MD5 hashes.

8. The method as claimed in claim 6 wherein the step of pushing the archived settings associated with the failed unit to the replacement unit occurs only after verifying an integrity of the archived settings and further comprises the steps of:
   locking out other connections to the central server until a migration of the archived settings to the replacement unit is complete; and
   rebooting the replacement unit.

9. The method as claimed in claim 6 further comprising the step of maintaining file integrity during the step of pushing the archived settings to the replacement unit.

10. The method as claimed in claim 6 wherein the step of maintaining file integrity during the step of pushing the archived settings to the replacement unit further comprises:
    the replacement unit only accepting files listed in a manifest for which the replacement unit has a first key for a manifest in the archived settings of the failed unit and a second key for a configuration bundle included in the manifest.

11. The method as claimed in claim 10 further comprising the steps of:
    discarding archived settings whose integrity cannot be verified;
    retrying the discarded archived settings for a predetermined number of tries; and
    abandoning the step of pushing the archived settings to the replacement unit if the file integrity cannot be verified within the predetermined number of tries.

12. A method for migrating settings archived from a failed unit to a replacement unit, the method comprising the steps of:
    monitoring, at a central server, a status of each unit in a plurality of units connected to the central server;
    archiving settings, on a daily basis, for each unit connected to the central server;
    detecting a failed unit;
    detecting a target unit replacing the failed unit;
    fetching archived settings associated with the failed unit;

verifying an integrity of the fetched archived settings using file sizes, hashes and encryption keys; and upon verification of the integrity of the fetched archived settings, pushing the archived settings associated with the failed unit to the target unit.

13. The method as claimed in claim 12 wherein the step of archiving settings further comprises the steps of:

requesting a manifest from the unit having its settings archived;

encrypting the manifest with a first key known to the central server and the unit being archived; and encrypting a configuration bundle in the manifest with a second key known only to the unit being archived and the target unit.

14. The method as claimed in claim 12 wherein the step of archiving settings further comprises the step of verifying a unit supports archiving settings.

15. The method as claimed in claim 12 wherein the step of archiving settings further comprises each unit being archived sending a manifest to the central server using an mget protocol over a standard secure (SSL) socket connection and the step of pushing the archived settings further comprises sending the archived settings to the target unit using an mput protocol over a standard secure (SSL) socket connection.

16. The method as claimed in claim 12 wherein the step of verifying an integrity of the fetched archived settings further comprises using MD5 hashes.

\* \* \* \* \*